UNITED STATES PATENT OFFICE.

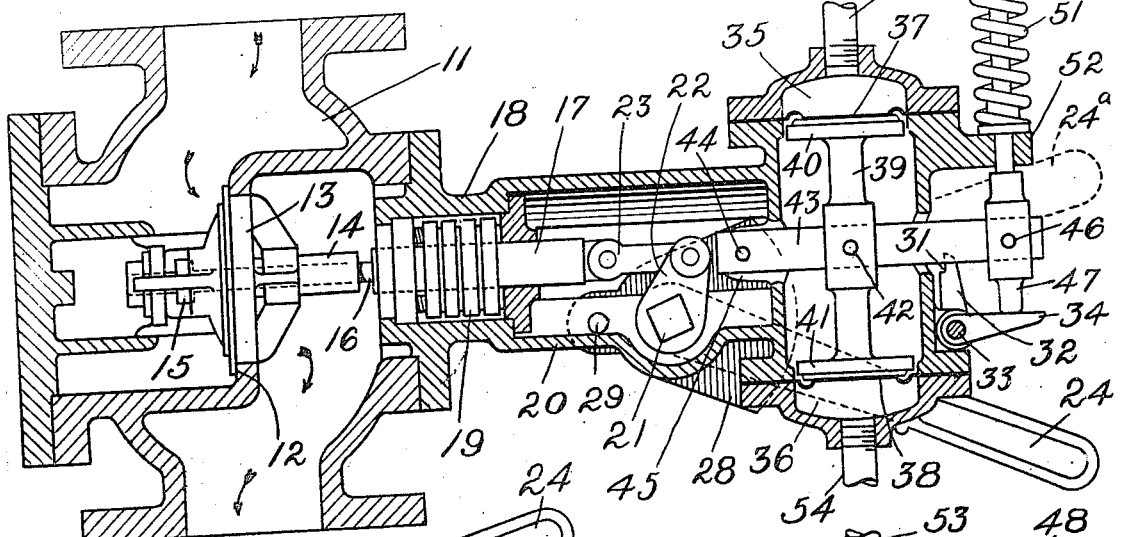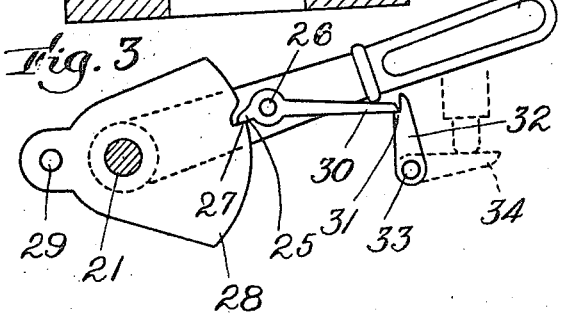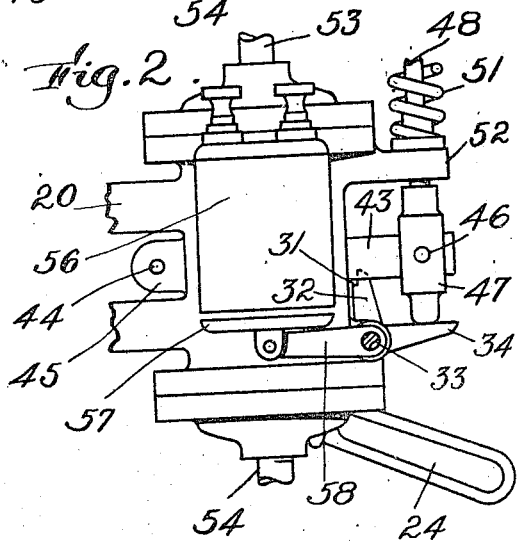

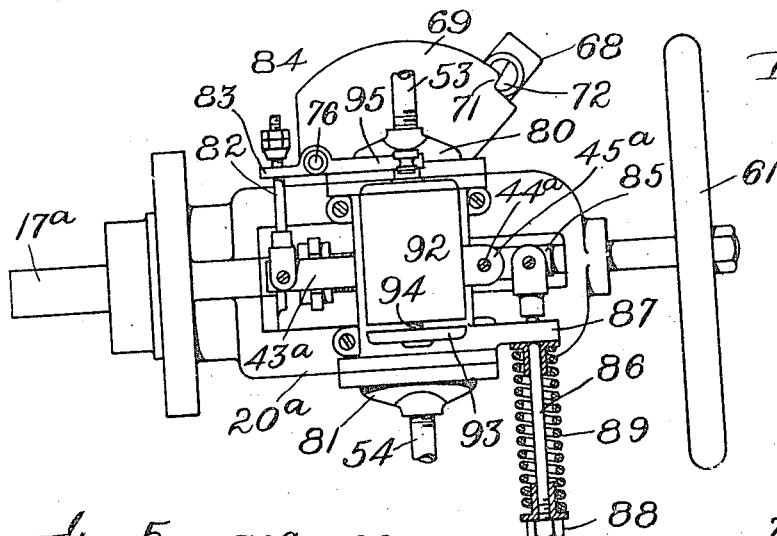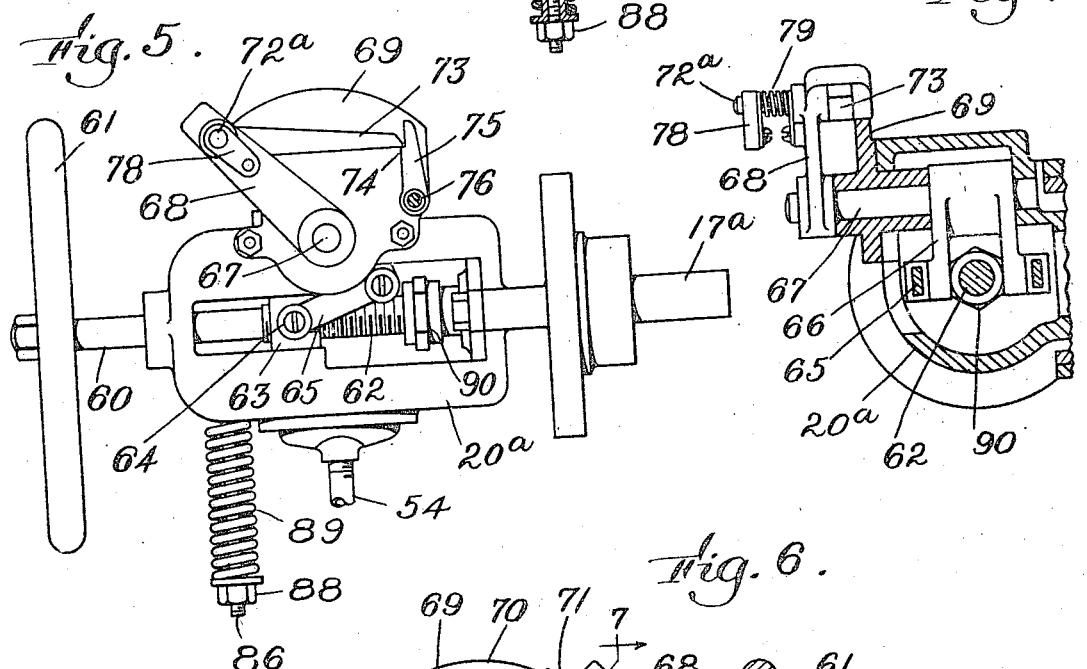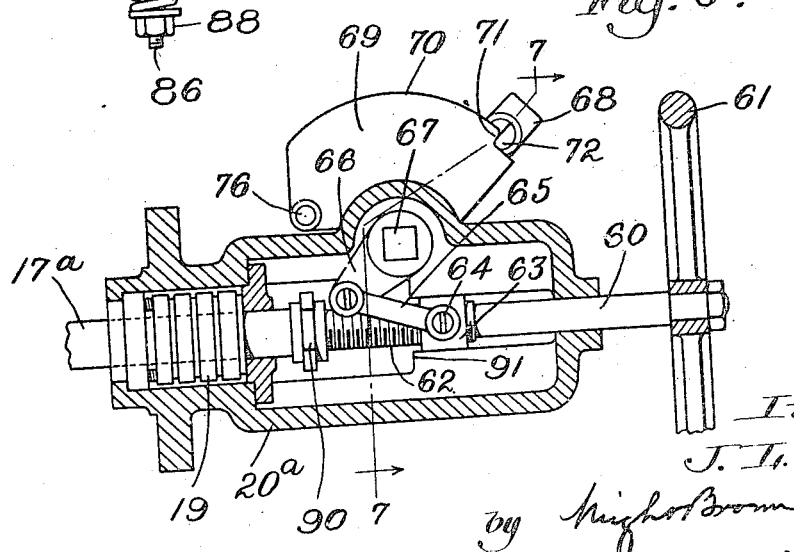

JAMES L. KIMBALL, OF SALEM, MASSACHUSETTS, ASSIGNOR TO RUGGLES-KLINGEMANN MFG. CO., OF BOSTON, MASSACHUSETTS, A CORPORATION OF MASSACHUSETTS.

AUTOMATIC STOP FOR VALVES.

1,322,906.

Specification of Letters Patent. Patented Nov. 25, 1919.

Application filed April 21, 1917. Serial No. 163,595.

*To all whom it may concern:*

Be it known that I, JAMES L. KIMBALL, a citizen of the United States, residing at Salem, in the county of Essex and State of Massachusetts, have invented new and useful Improvements in Automatic Stops for Valves, of which the following is a specification.

This invention relates to means for automatically closing a valve to stop the flow of fluid in a pipe line of any sort in case rupture of the pipe line or of the receiver of the fluid conducted by the pipe line, should occur; and is particularly applicable to steam lines which conduct steam from a boiler to an engine. In such application it may be arranged either to shut off the steam at the engine in case such an accident as blowing off the head of a cylinder should occur, or to the steam line near the boiler in case the steam main should burst, to avoid the disastrous results liable to follow from free escape of live steam. These instances of use of the invention, however, are merely illustrative and are given as such and without intent to indicate any limitation of the invention, for the same may be used in connection with any conduit where fluid is caused to flow from one point to another and is maintained at such a condition of pressure that abnormal release of the contained fluid would result in a great difference betwen the pressure at one point in the conduit and the pressure at the point of release.

While apparatus and appliances having the object and capable of securing generally the result above outlined have already been known, my invention contemplates an improved form of device or apparatus for this purpose which shall be more sensitive and more readily operated than those heretofore generally employed, and is also practically incapable of becoming inoperative from disuse. Devices of this nature are intended for use in emergencies only, and as long as the pipe line or conduit, and the engine or other container which receives the fluid transmitted by the conduit, remain intact it is not operated. The great defect of emergency devices heretofore used where they are exposed to steam, water, and other fluids, and particularly those exposed to steam and water, is that with disuse they are liable to become ineffective through the sticking of parts which are required to be moved in order that the device may operate as intended. It is part of my object to provide an apparatus of this character intended to be operated by the difference between two fluid pressures, which will be incapable of becoming inoperative from this cause no matter how long it may have been unused. Another object is to provide improvements in mechanical features whereby the operation of the valve closing elements of the device is made more simple, effective, and certain.

The particular features of improvement which constitute the invention are set forth in detail in the following specification, in connection with a description of specific embodiments of the invention, and are pointed out in the appended claims. In the drawings, Figure 1 is a longitudinal central section of the valve and automatic closing device embodying my invention.

Fig. 2 is an elevation of the closing device.

Fig. 3 is an elevation in detail of the trip mechanism which is released by the fluid-operated motor of the closing device.

Fig. 4 is a detail of another embodiment of my invention, containing the same principles but arranged for application to an engine throttle-valve.

Fig. 5 is an elevation of the opposite side of the apparatus shown in Fig. 4.

Fig. 6 is a longitudinal vertical section of this form of apparatus.

Fig. 7 is a cross sectional view of the trip of this device taken on line 7—7 of Fig. 6.

Fig. 8 is an elevation of another modification of my invention showing a different form of trip.

The same reference characters indicate the same parts in all the figures.

Referring first to Figs. 1, 2, and 3, 11 represents a valve fitting in which there is a valve seat 12 and a valve 13, the latter having a tubular stem 14 and being equipped with a pilot valve 15 of which the stem 16 passes through a passageway in the tubular valve stem 14. A rod 17 passes through a stuffing box 18 in the side of the valve fitting, wherein it is surrounded by packing members 19. This rod is connected to the stem 16 and is in line with the stem 14; it is also exposed at its inner end to the steam pressure within the valve casing and extends out to the atmosphere. Thus when pressed inwardly it is operable to open first the valve 15, thus equalizing the steam pressure on both sides of the main valve 13, and then to open the latter; while when unobstructed externally, the steam pressure acting upon it causes it to move the valves toward the closed position. In other words it is an actuator for the valves and is an abutment for holding the valves open against the pressure tending to close them which is exerted by the steam flowing through the valve casing in the direction of the arrows shown. This valve and its actuator are not novel with me and I do not claim the same in detail, or in any other manner than in combination with the tripping and motor mechanisms which are employed with them, and in which the new elements of my invention are embodied.

At one side of the valve casing is mounted a frame structure 20 on which is supported a rock shaft 21 having a short arm 22 connected to the rod or actuator 17 by a link 23, and on the same rock shaft is a handle 24 outside of the frame structure so placed as to be readily accessible to the operator. When this handle and the associated parts are in the position shown in Fig. 1, the valve is allowed to close, and it is held seated by the steam pressure. When the handle is raised to the position indicated by dotted lines at 24ᵃ in Fig. 1, the valve is opened, and the handle is held in this position by a latch 25 pivoted to it upon a stud 26 as shown in Fig. 3 and engaging a shoulder 27 on a quadrant 28 which is mounted in a fixed location on the frame 20, being held partly by a bolt passing through a hole 29 in the quadrant and partly by the rock shaft 21 which also passes through the quadrant. This shoulder 27 is in effect an abutment or rest for the latch.

The latch has a tail piece or arm 30 which is adapted to rest on a shoulder or abutment 31 of a rock arm 32 which is secured to a rock shaft 33. Said latch is thus in effect a two-armed lever, of which the latch proper 25 is considerably shorter than the extension or arm 30, being preferably only a fraction of the length of the latter. It is also a beam supported at both ends and in its turn supporting the handle 24 against the weight thereof and the pressure tending to close the valve exerted through the rod 17 and the other connections described. The load thus applied to the beam or latch is applied through the stud 26 which is located very near the fixed or stationary abutment 27 and remote from the other abutment 31, whereby the portion of the load sustained by the lateral abutment is only a fractional part of the entire load, whereby the latter abutment may be very easily withdrawn by movement of the arm 32. This is because the contact friction between the abutment 31 and arm 30 is relatively light.

On the rock shaft 33 which carries the abutment arm 32 is a second arm 34, the function of which will be presently described.

The frame structure 20 is extended so as to form two chambers 35 and 36, one wall of the chamber 35 being composed of a flexible diaphragm 37 and one wall of the chamber 36 being formed by a diaphragm 38. These chambers are arranged in substantially axial alinement with their diaphragms turned toward one another but separated by a sufficient distance to admit between them a post 39 which has heads 40 and 41 arranged to bear on the diaphragms 37 and 38, respectively. That is, the head engages both diaphragms when the latter are in substantially their mid positions. The post 39 is engaged by means of a pin 42 with a lever 43 of which the fulcrum is a pin 44 mounted in lugs 45 on the frame structure. Conveniently the post is enlarged at its center and slotted so that the lever passes through it, but this is a detail of construction which may be modified. Said lever extends approximately parallel to the rock arm 34 previously described, and is connected by means of a pin 46 with a tappet 47 which engages the arm 34. This tappet has an extension rod 48 provided with an adjustable abutment nut 49 and washer 50 against which presses a spring 51 surrounding the rod and reacting against a shoulder 52 on the frame structure. This spring tends to withdraw the tappet from arm 34, but is yieldable to permit movement of the tappet toward the arm by force exerted thereon by lever 43.

Steam or other fluid from points is admitted to the chambers 35 and 36 by pipes 53 and 54, respectively, from points in or communicating with the pipe line or conduit at opposite sides of the valve. Where the invention is applied as an engine stop the valve is located in the engine supply pipe and the connection 54 is connected to said supply pipe between the valve 11 and the engine throttle valve, and near the latter; while the connection 53 is joined to the main steam header, for example, or some other point between the valve and the boiler. When applied as a shut off generally in order to prevent escape of steam from a burst pipe anywhere in the power plant, the valve is preferably located in the main steam pipe near the boiler and the connections 53 and 54 are joined with the main steam pipe on opposite sides of the valve, or with the boiler and with a distant part of the steam piping, respectively. In any event, and in whatever location used, the pressure fluid connections with the chambers 35 and 36 are so arranged that whenever loss of pressure occurs on the outlet side of the valve, whether caused by blowing out of a cylinder head or other damage to the engine, or bursting of a pipe anywhere, the pressure on the diaphragm 38 immediately becomes so much less than the pressure on the diaphragm 37, that the post 39 is displaced endwise and it moves the tappet 47 so as to rock the arm 34 and thereby displace the abutment 31 from the latch arm 30. The latter, being then left without support at one end, is free to turn about its pivot 26 so that the latch 25 no longer supports the handle 24. The rod 17 is then left unopposed and acts as a motor in the manner previously described to close the valve.

The spring 51 is provided to balance the normal drop of pressure in the pipe line between the points at which the connection pipes 53 and 54 are connected, so that the stop will not be tripped except when an abnormal difference of pressure occurs.

I also combine with the automatic mechanism hereinbefore described an electromagnetic apparatus in order that the stop may be tripped at will by the engineer or other attendant at a distance. This device consists of an electromagnet 56 mounted preferably on the outside of the case or frame in which the post 39 is contained, and having an armature 57 which is joined to an arm 58 attached to the rock shaft 33 in such a manner that movement of the armature when attracted by the magnet withdraws the abutment arm 32 from the latch arm 30.

The mechanical arrangement which is shown in detail in Fig. 1 provides the pressure chambers 35 and 36 in the heads of a cylindrical structure which is open to the atmosphere at its middle part, and is formed as a component part of the frame 20, the latter also being part of the stuffing box 18, which is in the form of a bonnet mounted upon the side of the valve case. The diaphragms 37 and 38 are clamped between flanges on the aforesaid heads and the body of said cylindrical structure. This construction gives the necessary relation of the parts whereby the steam pressures in the two chambers tend to move the diaphragms oppositely to one another and press oppositely upon post 39. It is obvious, of course, that other constructions may be readily devised by the skilled mechanic to accomplish the same ends. So far as this feature of my invention is concerned the essentials are simply that the diaphragms should so act on a trip mechanism as to tend at the same time to move the trip mechanism in opposite directions, whereby when the pressures acting are normal, these forces are balanced. Any combination of parts which secures this effect is within the scope of my invention. The important feature is that the movable parts which are directly acted upon by steam pressure are diaphragms which are flexible and capable of distortion under unbalanced pressure on one side, and that such diaphragms act upon a freely movable mechanical part which latter is so mounted that it is removed from contact with steam or water and is not required to fit upon any sort of guiding means. Thus it is not liable to stick by being corroded or by accumulation of foreign matter and will remain fully operative after long periods of disuse. Likewise the diaphragms can not be made inoperative by disuse, whereby the motor (by which I mean the pressure operated diaphragms and the motion transmitting elements actuated thereby) remains fully effective in spite of neglect and disuse.

The latch 25 with its extension 30 forming a bridge constitutes an improved trip mechanism which I claim as part of my invention. It holds the valve in the open position with perfect security, but offers little or no appreciable resistance to being released by the motor, whereby the apparatus combines extreme sensitiveness with perfect security. Evidently this sensitiveness allows the valve stop to be tripped and released as soon as the steam pressure on the discharge side of the valve has dropped even slightly below normal and therefore instantly upon the occurrence of such a rupture or leak as would be at all dangerous. The latch is preferably provided with a spring, substantially such as is shown in Fig. 7 and will be presently described, which causes it to bear constantly against the face of the quadrant and to enter the notch above the shoulder 27 when the handle is raised, thereby raising the extension 30 and engaging the latter automatically with the abutment 31 at the same time, whereby the valve may be opened and locked by a single movement of the handle 24 and requiring the use of only one hand by the operator.

Figs. 4 to 7 show the adaptation of my invention to a throttle valve in a manner such that the throttle valve may be opened to any width and may be automatically closed however widely it may have been opened, by the automatic trip device. In these figures I have not shown the valve, but it is to be understood that the valve may be of any type suitable for a throttle valve. The rod 17ᵃ in these figures corresponds to rod 17 of Fig. 1, and is arranged and acts in the same way as there shown, or as any throttle valve stem, to open or close the valve and hold it open. It is connected with or formed as a part of the stem 60, which is equipped with a hand wheel 61 and has a screw threaded portion 62. Said threaded portion is engaged with a nut 63, the same being an internally threaded block having trunnions 64 on its opposite sides which are connected by links 65 with the two portions respectively of a forked rock arm 66 which is mounted upon a rock shaft 67 corresponding to the rock shaft 21 of the apparatus first described. These parts are mounted in a frame structure 20ᵃ similar to the frame structure 20 previously described which is mounted on the side of the valve casing in the manner shown in Fig. 1. On the same rock shaft is secured an arm 68 outside the frame structure, beside which is fixed a quadrant plate 69 having a face 70 concentric with the shaft 67 and having a shoulder or abutment 71. The arm 68 carries a rotatably mounted latch 72 to which is connected an arm 73, the latter being arranged to engage a shoulder or abutment 74 on a rock arm 75 mounted on a rock shaft or stud 76 which is journaled in the quadrant plate 69. The latch 72 in the form now being described is formed as a part of a stud which is journaled in the arm 68, such part being cut away at one side so as to provide a surface substantially radial to the stud, a part of which bears against the shoulder 71, the part so engaged being, of course, wholly at one side of the axis of the stud. The said stud has an extension 72ᵃ on which there is fixed an anchor piece 78 for one end of a spring 79 which is coiled about said stud extension, and the other end of which is secured to the arm 68. This spring simply tends to bring the latch into the position shown in Figs. 4 and 6, and the arm 73 into the position shown in Fig. 5, and causes the latch to bear against the quadrant plate surface 70 at all times except when it is engaged with the shoulder 71.

A motor substantially like that shown in Fig. 1 is mounted on the frame structure 20, its exterior being shown in Fig. 4. The heads which contain the pressure chambers and confine the diaphragms are designated 80 and 81, respectively, while the connection pipes are numbered 53 and 54 as in Fig. 1. A post similar to the post 39 is engaged with a lever 43ᵃ pivoted at 44ᵃ to a lug 45ᵃ on the side of the motor frame. Said lever is connected by a link or connecting rod 82 with an arm 83 in a manner providing for lost motion, said arm being secured to the rock shaft 76 which carries the abutment arm 75. The lost motion referred to is provided by passing the rod 82 through an opening in the arm 83, through which the rod may move freely, and providing a nut or equivalent adjustable abutment 84 on the rod so that when the lever 43ᵃ is moved in one direction the arm 83 is correspondingly moved, but the arm may also be moved in the same direction without affecting the lever, or without being resisted thereby. This lost motion is provided in order that the rock shaft 76 may be turned by an electromagnet, presently to be described, as well as by the pressure operated motor. The lever 43ᵃ has an arm 85 to which is pivotally connected a rod 86 passing through a lug 87 on the frame structure and having an adjustable abutment nut 88 between which and the lug 87 is a spring 89 surrounding rod 86, such spring having the same function as the spring 51 shown in Fig. 1 of balancing the normal difference of pressure in the motor chambers due to the drop in pressure between the points in the pipe line at which the connections 53 and 54 are joined thereto.

The trip being in the normal position shown in Fig. 5, it is evident that the throttle valve may be opened more or less by turning the hand wheel 61 whereby the stem 60 and rod 17ᵃ are advanced or retracted in a manner similar to the stem of an ordinary throttle valve, but when sudden loss of pressure occurs at the engine, the motor acts through the lever 43ᵃ, link rod 82, arm 83, and rock shaft 76 to withdraw the abutment arm from the latch arm 73, releasing the latch 72 and allowing the valve to close, the closing movement of the latter forcing the stem 60 backward and swinging the arm 68 to the left with respect to Figs. 4 and 6 and to the right with respect to Fig. 5. For thereafter setting the stop, stem 60 may be rotated to advance the nut or traveler 63 until the latch 72 is again engaged with the shoulder 71 and the trip arm 73 is engaged with the abutment 74. Coupling 90 between stem 60 and rod 17ᵃ is a swivel which permits said stem to be turned without turning the valve, the latter being forcibly held against its seat by the unbalanced pressure acting on it to return the trip to the normal position without opening the valve. When the trip mechanism is again locked the valve may be opened to any desired extent by rotating the hand wheel and stem in the opposite direction.

This form of the invention is also operable by electromagnetic means comprising a magnet 92 having an armature 93 which is connected with a rod 94 passing through the magnet core and connected with an arm 95 which is secured to the trip rock shaft 76 and is a part of the same lever as the arm 83. The operation of the trip by means of the electromagnet may be effected by closing a switch at a distant point, and its action takes place without impedance by the pressure motor by reason of the lost motion connection between the arm 83 and the rod 82, previously described.

The two embodiments of the invention hereinbefore described are alike in the following respects both have the same type of pressure operated motor and comprising two diaphragm chambers, a rigid member in engagement with both diaphragms and pressed upon thereby with motion-causing tendencies in relatively opposite directions, and a trip which is operated by the motor. Both also possess the combination of pressure operated motive means and an electromagnetic motor combined and arranged for operating the same trip. And finally each exhibits substantially the same type of latch or trip comprising essentially a lever having arms of different length, the short arm of which is the latch proper and the long arm is the trip, which is engaged with a displaceable support in such a manner that it is securely held, but does not oppose appreciable frictional resistance to the displacement of the support. In each case the latch trip is automatically engaged with its support when the latch proper is engaged; being actuated in the one case by the spring 79, and in the other form by a spring essentially like it which surrounds the pivot stud and engages a part of the latch 25, or of the trip arm 30, and the handle 24.

A further modification is shown in Fig. 8 where a valve of the butterfly type is indicated at 96. This valve has a stem 97 to which is secured an arm 98 carrying a weight 99. Connected to the arm 98 is a shorter arm 100 having a notch and shoulder 101 which is engaged with a latch 102. The weighted arm tends to close the valve, but is normally held in the raised position, where the valve is opened, by the latch 102. The latter has a tail 103. A pressure motor essentially like those already described, and having parts designated by the same characters as in Fig. 4, is mounted on a post 105 which is secured to the valve casing. The lever 43$^b$, which is engaged with the post 39$^b$ of the pressure motor, is itself constructed as a latch, having a hook portion 106 on its end, which is engaged with an adjustable screw 107 on a hammer 108 mounted by a pivot 109 on a bracket 110 secured to the supporting frame work of the pressure motor. This hammer is adapted to swing in the path indicated by the broken lines in Fig. 8, and the tail arm 103 projects into this path. Thus when the pressure in the upper chamber of the motor overbalances materially that in the lower chamber, the latch 106 is disengaged from the stud 107, releasing the hammer, which has been held far enough to one side of the position vertically above the pivot 109, whereupon the latter falls, and swinging about its pivot forcibly strikes the tail arm 103, thereby releasing latch 102 from the stop arm 100 of the weighted lever 98. The valve is then closed by the descent of the weighted arm.

It is to be understood that any part of the foregoing description which may state or imply that the valves mentioned are inserted in a steam line and that the pressure operated motor is actuated by steam pressure, is not intended in any sense as a limitation in the use of the invention, since any of the valves and the trip devices for the same may be inserted in pipe lines or conduits, or between containers, wherein is confined any sort of fluid, and that the pressure motor may be operated by any such fluid, whether the same be water or other liquid, or any gas or vapor, as well as steam. Accordingly the term "steam" as used herein is intended to include generically all fluids.

What I claim and desire to secure by Letters Patent is:

1. A differential pressure motor composing oppositely disposed pressure chambers adapted to receive pressure fluid from different sources and each having a flexible diaphragm at the side thereof toward the other chamber, a freely movable post interposed between and in contact with said diaphragms, a valve holding means including a latch, a release member displaceable to cause release of said latch, and means connected with said post for causing displacement of said release member to occur when the post is moved in a given direction by preponderance of pressure in one of said chambers over the other.

2. The combination with a valve adapted to be inserted in a pipe line, of a pressure motor comprising diaphragm chambers connected with such pipe line respectively at opposite sides of the valve, a post interposed between the diaphragms of said chambers, the chambers being so arranged as to press oppositely upon said post, a valve actuator including a retaining latch, a trip for said latch, and mechanism operated by said post to cause release of the latch by said trip.

3. The combination with a valve-controlling arm of a latch for holding said arm in a given position, oppositely disposed pressure chambers adapted to receive fluid under pressure from points at the opposite sides of a valve, each of said chambers having a diaphragm, an interposed freely movable post engaged with and pressed upon oppositely by said diaphragms, a spring exerting pressure on said post to balance a normal difference between the pressures exerted on said post and a latch-releasing mechanism controlled and operable by movement of said post to cause release of the latch.

4. The combination with a valve controlling arm of a latch pivoted thereon, a fixed shoulder with which said latch is engageable when the arm is in a given position, a trip arm connected with said latch, an abutment for said arm adapted to secure the same in position when the latch is so engaged, a rock shaft by which said abutment is carried, a pressure motor, an electromagnet, and means operable by either motor or said magnet for so rocking said shaft as to disengage said abutment from said rock arm.

5. The combination with a valve-controlling member of a latch for holding the same in a given position, a differential pressure motor, and an electromagnet, both said motor and said magnet being operable to cause release of said latch.

6. A differential pressure motor comprising oppositely arranged chambers adapted to receive pressure-transmitting fluid from different sources, each of said chambers having a flexible diaphragm, a member interposed between and pressed oppositely upon by said diaphragms and a spring exerting pressure upon said member to balance a normal difference between the pressures exerted by said diaphragms thereon.

7. The combination with a valve controlling arm, of a latch pivoted to said arm and having a trip arm, a fixed quadrant plate having a latch-engaging shoulder and a latch-guiding surface adjacent to said shoulder concentric with the path of movement of the latch, a spring acting on said latch for causing the same automatically to swing into engagement with said shoulder when brought opposite to the same by movement of the arm, and a trip abutment arranged in position to be engaged by said latch-trip arm at the same time.

8. The combination with a movable valve-controlling element, a latch pivoted to and carried by said element, a guide extending alongside the path of movement of said latch having a shoulder to be engaged with the latter, a spring acting on said latch operative to press the same against said guide and swing it into engagement with said shoulder when brought opposite to the latter, a trip arm connected to the latch and an abutment in position to engage with and lock said trip arm at the same time that the latch is thus brought into engagement with said shoulder.

9. A differential pressure motor comprising a rigid frame having chambers at opposite ends adapted to receive fluid under pressure, diaphragms mounted across the inner sides of said chambers, a post interposed between and pressed upon by said diaphragm, an arm having its fulcrum on said frame and being pivoted to said post, and means for leading fluid-transmitting pressure to said chambers from different sources.

10. A differential pressure motor comprising a rigid frame having chambers at opposite ends adapted to receive fluid under pressure, diaphragms mounted across the inner sides of said chambers, a post interposed between and pressed upon by said diaphragm, an arm having its fulcrum on said frame and being pivoted to said post, means for leading fluid-transmitting pressure to said chambers from different sources and a spring arranged to apply pressure to said arm in one direction to balance the normal difference between the pressures exerted thereon by the respective chambers.

In testimony whereof I have affixed my signature.

JAMES L. KIMBALL.